United States Patent
Beebe

(10) Patent No.: US 8,265,796 B2
(45) Date of Patent: Sep. 11, 2012

(54) VIRTUAL DISPENSING SYSTEM

(75) Inventor: W. Scott Beebe, Berkley, MA (US)

(73) Assignee: Fishman Corporation, Hopkinton, MA (US)

(*) Notice: Subject to any disclaimer, the term of this patent is extended or adjusted under 35 U.S.C. 154(b) by 36 days.

(21) Appl. No.: 12/835,796

(22) Filed: Jul. 14, 2010

(65) Prior Publication Data

US 2011/0245984 A1    Oct. 6, 2011

Related U.S. Application Data

(63) Continuation of application No. 12/751,380, filed on Mar. 31, 2010.

(51) Int. Cl.
| | |
|---|---|
| *G05D 11/00* | (2006.01) |
| *G06F 17/00* | (2006.01) |
| *G01F 25/00* | (2006.01) |
| *B67D 7/56* | (2010.01) |

(52) U.S. Cl. ........... 700/283; 700/240; 73/1.74; 222/23; 222/52

(58) Field of Classification Search ................... 700/283; 239/398
See application file for complete search history.

(56) References Cited

U.S. PATENT DOCUMENTS

| | | | | |
|---|---|---|---|---|
| 4,237,536 A * | 12/1980 | Enelow et al. | ................ | 700/283 |
| 5,630,527 A | 5/1997 | Beebe et al. | | |
| 5,711,989 A | 1/1998 | Ciardella et al. | | |
| 5,765,722 A | 6/1998 | Beebe et al. | | |
| 6,259,956 B1 * | 7/2001 | Myers et al. | ................ | 700/244 |
| 6,546,314 B1 * | 4/2003 | Carr et al. | ................ | 700/244 |
| 6,564,121 B1 * | 5/2003 | Wallace et al. | ................ | 700/231 |
| 6,567,710 B1 * | 5/2003 | Boelkins | ................ | 700/283 |
| 6,682,601 B1 | 1/2004 | Beebe | | |
| 6,719,453 B2 * | 4/2004 | Cosman et al. | ................ | 366/141 |
| 6,739,877 B2 * | 5/2004 | Bailey et al. | ................ | 434/262 |
| 6,823,270 B1 * | 11/2004 | Roys | ................ | 702/45 |
| 6,850,849 B1 * | 2/2005 | Roys | ................ | 702/45 |
| 6,918,771 B2 * | 7/2005 | Arington et al. | ................ | 434/262 |
| 6,970,769 B2 * | 11/2005 | Rice et al. | ................ | 700/216 |
| 7,013,894 B2 * | 3/2006 | McFarland, Jr. | ................ | 128/205.24 |
| 7,035,741 B2 * | 4/2006 | Taylor | ................ | 702/45 |
| 7,072,738 B2 * | 7/2006 | Bonney et al. | ................ | 700/237 |
| 7,151,982 B2 * | 12/2006 | Liff et al. | ................ | 700/241 |
| 7,270,013 B2 * | 9/2007 | Bhullar et al. | ................ | 702/100 |
| 7,292,914 B2 * | 11/2007 | Jungmann et al. | ................ | 700/285 |
| 7,379,827 B1 * | 5/2008 | Roys | ................ | 702/45 |
| 7,430,838 B2 * | 10/2008 | Rice et al. | ................ | 700/235 |

(Continued)

OTHER PUBLICATIONS

Wikipedia Online Resource, "Web Conferencing", Apr. 2011, obtained online at www.en.wikipedia.org/wiki/Web_conferencing.*

(Continued)

*Primary Examiner* — Mohammad Ali
*Assistant Examiner* — Kelvin Booker
(74) *Attorney, Agent, or Firm* — Brian M. Dingman; Mirick, O'Connell, DeMallie & Lougee

(57) ABSTRACT

A network of fluid dispenser systems is disclosed where a Host/Server is a virtual controller for a number of fluid dispensers systems. The virtual controller may exchange information with local dispenser systems, that incorporate virtual controlling functions. The information may be dispensing processes, information regarding quality and reliability, problems and/or helpful information, and applications. An application may include synchronizing multiple dispensing syringe assemblies. The information may be exchanged in real time during fluid dispensing where any issues may be shared and resolved quickly even in remote locales. Information may be distributed among the disparate locations.

14 Claims, 3 Drawing Sheets

U.S. PATENT DOCUMENTS

| | | | |
|---|---|---|---|
| 7,627,397 B2 * | 12/2009 | Parraga | 700/282 |
| 7,720,574 B1 * | 5/2010 | Roys | 700/282 |
| 7,783,380 B2 * | 8/2010 | York et al. | 700/240 |
| 7,803,321 B2 * | 9/2010 | Lark et al. | 422/62 |
| 7,930,066 B2 * | 4/2011 | Eliuk et al. | 700/245 |
| 7,970,558 B1 * | 6/2011 | Roys | 702/46 |
| 8,019,471 B2 * | 9/2011 | Bogash et al. | 700/242 |
| 2002/0034456 A1 * | 3/2002 | Ford et al. | 422/63 |
| 2002/0138216 A1 * | 9/2002 | Taylor | 702/45 |
| 2002/0198609 A1 * | 12/2002 | Baron | 700/48 |
| 2003/0012081 A1 * | 1/2003 | Jungmann et al. | 700/285 |
| 2003/0028285 A1 * | 2/2003 | Zura et al. | 700/241 |
| 2003/0065457 A1 * | 4/2003 | Taylor | 702/45 |
| 2003/0149505 A1 * | 8/2003 | Mogensen | 700/283 |
| 2005/0096796 A1 * | 5/2005 | Filev | 700/283 |
| 2005/0244569 A1 | 11/2005 | Estelle et al. | |
| 2005/0251289 A1 * | 11/2005 | Bonney et al. | 700/244 |
| 2006/0030953 A1 | 2/2006 | Cantrell et al. | |
| 2006/0206238 A1 * | 9/2006 | Walker et al. | 700/283 |
| 2007/0119859 A1 * | 5/2007 | Harrell | 700/283 |
| 2007/0150092 A1 * | 6/2007 | Ohmura et al. | 700/231 |
| 2007/0185615 A1 * | 8/2007 | Bossi et al. | 700/244 |
| 2007/0228071 A1 * | 10/2007 | Kamen et al. | 222/52 |
| 2007/0255451 A1 * | 11/2007 | Lewis et al. | 700/240 |
| 2007/0265733 A1 * | 11/2007 | Harrell | 700/283 |
| 2008/0051937 A1 * | 2/2008 | Khan et al. | 700/240 |
| 2008/0061163 A1 * | 3/2008 | Kubby et al. | 700/283 |
| 2009/0069949 A1 * | 3/2009 | Carpenter et al. | 700/283 |
| 2009/0171502 A1 * | 7/2009 | Freidin | 700/240 |
| 2009/0240363 A1 * | 9/2009 | Hughes et al. | 700/283 |
| 2010/0228400 A1 * | 9/2010 | Johnson et al. | 700/283 |
| 2010/0249995 A1 * | 9/2010 | Williams et al. | 700/233 |
| 2011/0046772 A1 * | 2/2011 | Healey et al. | 700/283 |
| 2011/0082595 A1 * | 4/2011 | Mehus et al. | 700/283 |
| 2011/0231114 A1 * | 9/2011 | Roys | 702/45 |
| 2012/0029691 A1 * | 2/2012 | Mockus et al. | 700/232 |

OTHER PUBLICATIONS

Beebe, W. Scott. "Fluid Dispensing System", U.S. Appl. No. 12/568,180, filed Sep. 28, 2009, 15 pages.

Beebe, W. Scott. "Remotely Controlled Fluid Dispenser", U.S. Appl. No. 12/751,380, filed Mar. 31, 2010, 16 pages.

Invitation to Pay Additional Fees and, Where Applicable, Protest Fee (with Annex to Form PCT/ISA/206) mailed May 6, 2011 in PCT/US2011/000271, Applicant: Fishman Corporation.

* cited by examiner

VIRTUAL DISPENSING SYSTEM

RELATED APPLICATIONS

The present application is a continuation of U.S. patent application Ser. No. 12/751,380, entitled REMOTELY CONTROLLED FLUID DISPENSER, filed on Mar. 31, 2010 having the same inventor and ownership as the present application. This earlier U.S. Patent Application is hereby incorporated herein by reference.

FIELD OF THE INVENTION

The present invention is related to fluid dispensing methods and systems that are part of a network where a Host/Server may control multiple independent dispensing systems that are geographically remote from each other and from the Host Server. Herein "network" may be the Internet (defined broadly herein to include the cloud, Web, etc.). "Cloud" refers to the ability to perform a task coordinating and using applications, data sources, etc., that are found at different locations on the Internet. "Host/Server" is discussed below as a single computing entity, but the "Host/Server" may be distributed processors or multiple processors that could be at different locations or addresses on the network or on alternative networks.

BACKGROUND INFORMATION

Dispensing consistent, controllable, and accurate amounts of fluid of varying viscosities remains an issue for product manufacturers and suppliers. For example, for product manufacturing, it is important to reliably and accurately dispense adhesives to ensure high quality and structural integrity of the end product. Herein, the end product may be virtually any assembly where adhesives are used to secure parts of structures together. The range of products is broad, e.g., airplane assemblies to audio systems, furniture, housings, packaging, etc.

Typically, an individual dispensing system consists of two main assemblies. One is a controller having computing power (a processor, micro-processor, DSP (digital signal processor, etc.), and the second is an industrial syringe assembly that is driven from the controller. The above incorporated-by-reference patent application discloses such dispensing systems that are remotely controlled by a Host. In such systems, dispensing information for a particular task may be down loaded from the Host wherein the controller commands the syringe assembly to dispense. Information is transferred bilaterally between the Host and the individual dispensing systems that allow confirmation and real time feedback on relevant issues. These systems provide uniform, high quality, world wide dispensing and constitute an important competitive advantage.

The following illuminates general technical terms used in fluid dispensing systems. For example when dispensing adhesives and like fluids, the term "dot" or "bead" refers to the form factor of a quantity of fluid dispensed and "fluid" refers to liquids or suspensions or other such materials that react as do materials that fit the common definition of a fluid e.g., water. "Dot" refers to a single, stand alone quantity of fluid, while "bead" refers to a continuous, dispensed strand of fluid. In each case the quantity dispensed is important. For example when a bead is being dispensed in a curved strand the dispenser must accommodate the dynamic differences compared to a straight line dispensing in order to have a uniform bead.

The location of the dot or bead being dispensed on the work piece relies on positioning equipment that controls the X-Y position of a work piece or manual abilities with a dispensing gun that are well known in the art.

Regardless of geographic location, precise (repeatable) and accurate dispensing of adhesives is important to quality assembly of products.

SUMMARY OF THE INVENTION

The present invention discloses a system for remotely controlling the dispensing syringe of fluids onto work pieces. A Host/Server is in communication with many dispenser systems via the Internet, wherein the Host/Server may be a virtual controller for many dispenser systems. Each dispenser system includes a syringe assembly that is directly controlled by a tenant. A tenant, preferably, is a PCB (printed circuit board) housed with others in a thin client. The tenants may also be configured as virtual tenants. The tenants communicate with the Host/Server via the Internet and with each other by a local network, and resources may be accessed used by the Host/Server and the tenants via the Internet.

The Host/Server virtual controller configuration also provides for dispensing applications where multiple tenants may be synchronized with each other and the work piece or pieces.

The tenants communicate with each other within the thin client enclosure via a cable or wirelessly (Bluetooth, IR, etc.) The plug-in tenant PCBs may generate the drive signals to position the work piece and the syringe tip, relative to each other, whereupon a programmed fluid amount is dispensed at a precise location on a work piece. The syringe assembly may contain the motors to drive a syringe piston.

Tenants may have processors, micro-processors or DSP's and memory and I/O (Input/Output) to control a multitude of syringe assembly functions. The I/O may include communications network to the Internet and wired or wireless connections to a control keyboard and other switches and displays. The wireless connections may include: Bluetooth, IR, WIFI, etc. The tenants may be configured with capabilities to drive stepping or other (servo-motors, etc.) positioning motors to locate a syringe tip and then driving the syringe piston to dispense a fluid. In one preferred embodiment, there is a tenant PCB for each syringe assembly. The PCB may include the motor drive signals for positioning the work piece (say, on an X-Y table) relative to the syringe tips and the syringe piston drive signals to dispense fluids, respectively.

The Host/Server may communicate via the Internet or a like network with a plurality of thin clients" distributed around the world. The Host/Server may download the dispensing operation for a single syringe to a tenant PCB connected to the particular syringe. The local personnel may trigger the start of the dispensing via a keyboard command and of the operation details may be communicated back to the Host Server for real time control.

In one preferred embodiment, the Host/Server, the switches, thin clients, tenants are built using virtual technologies. Such virtual technologies and associated components are known in the art from manufactures like VMware, Cisco, Network Appliances, EMC, and others. These technologies provide for virtual switches, Ethernets, LANs, etc. that emulate physical devices, etc. and provide cost and operational efficiencies. In many instances within this application, where physical devices are suggested or described, e.g., tenants, virtual ware may be used. Herein "virtual" refers to one platform, e.g. a Host/Server controller or tenant, configured in software to emulate many such platforms, e.g., many Host/Server controller or tenants, respectively.

A Host/Server at a location removed (in the next room or the next country) from the dispensing syringes may download and upload software to and from the tenants, and the tenants may transfer information with each other. The uploaded information from a syringe assembly may include the "status." Status refers to, inter alia, the details of the dispensing process for each syringe assembly. The monitoring may include video and audio interchange between the Host Server and the specific syringe in real time. For example, a picture of a dot or bead may be sent to the Host Server for evaluation, and the Host Server may measure the accuracy of the dot or bead dispensed, by, for example, comparing the weight of adhesive dispensed (starting off with a known weight and the means to measure the adhesive remaining) and comparing the video of the dot or bead to a model or a template of the dot or bead. There may be mechanical alignment and positioning details that the Host/Server may monitor. The Host/Server may activate an audible or visual alarm to signal the local personnel that their attention may be needed.

In one application, tenants may connect to syringe assemblies that may be distributed throughout a large manufacturing or commercial facility. Any issue (positive or negative) found at one facility or at one syringe assembly may be made known to the other facilities immediately. Any operation taken in response to an issue also will be available to the other locations within seconds. This coordinating may have special application where manufacturing standards must be met regardless of where the manufacturing or use occurs.

A dispensing process, moreover, may be developed at one location or loaded into a Host/Server and be downloaded to local tenants as part of a training session. The process may be tested in real time. In order to develop processes and other related applications, for example, open sourcing of tools for developing applications may be available at the Host/Server or at a local tenant A user may develop applications that may be made available world wide. In such a case, any problem or issue at one facility may be quickly found and resolved in real time.

Related applications may include the ability to share dispensing processes and special reporting and/or monitoring applications directly between local tenants and/or a Host/Server. Additionally, information and training "Webinars" may be developed and made available to local users and/or to any site on the network. The Webinars may also be directed to and be helpful for manufacturing, marketing, sales, purchasing and inventory support.

Monitoring may include production schedules, projections and cycle times, including materials needed, and matching orders to production dates. Additionally the number of accepted and rejected dispensers may be monitored per day, month, and year. Discrepancies compared to normal rates that are discovered may result in warnings that may require local personnel attention.

For devices that are manufactured as meeting some industry standard criteria for validation or approval, it may be possible to build a secure remotely controlled network of systems and an application that would allow validation at many locations at the same time. This would vastly improve the efficiency of any such operation, and such would save time and costs.

The prior art one controller to one dispenser is replaced with a cost efficient one central Host/Servers that coordinate dispensing at many different locations may provide more consistent, quicker and more cost efficient operations. One Host/Server may be shared among many dispensing syringe assemblies with efficiencies of scale and program standardization.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
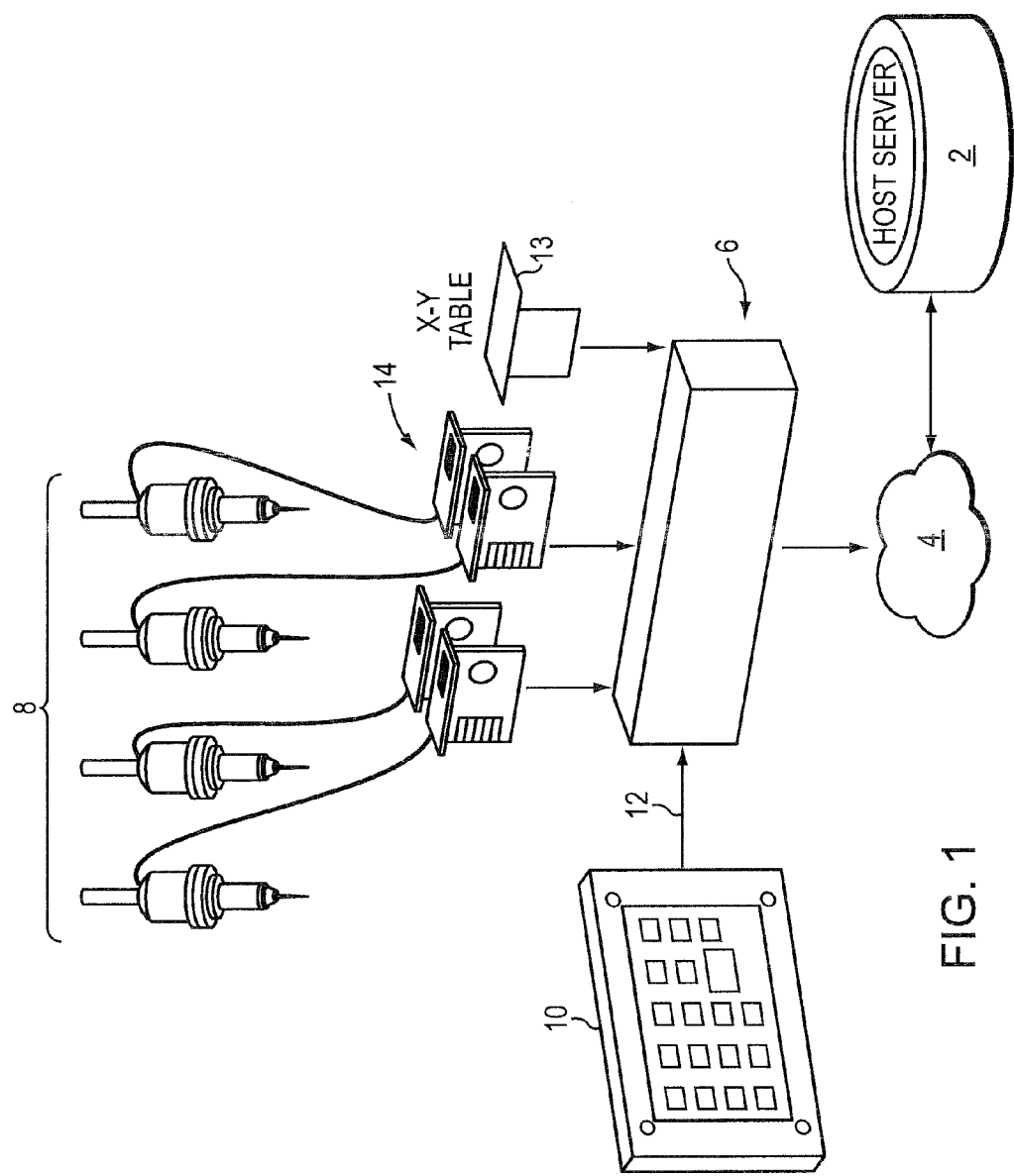
FIG. 1 is a block diagram of a Host dispenser controller in communication with many local thin clients via the Internet.

FIG. 1 illustrates a Host 2 controller communicating via the Internet 4 to one of many thin clients 6. within each thin client 6 there may be many plug-in boards 14, referred to herein as "tenants." Each tenant 14 drives a syringe assembly 8 that may include a work piece position assembly, not shown. Another configuration may include a tenant 14 driving an X-Y table 13 to position a work piece with respect to a syringe tip. In such a case, the tenant dispensing fluid and the tenant positioning the work piece may be synchronized.

The thin client 6 will communicate with the Internet 4 to the host server 2, but will also communicate with a local user interface 10. In FIG. 1 the interface 10 connects to the thin client 6 via a Bluetooth® connection 12, but other connection schemes (WiFi, IR, etc.) may be used. The interface 10 may be used by local personnel to start, stop, or pause the dispensing, but the controller may be arranged to communicate bilaterally with the Host Server via the thin client and the Internet. The interface 10 may include a GUI, a touch screen, keyboard, LED's, etc.

The thin client 6 may arrange to communicate with the tenants 14 via a bussed Ethernet® or any of many known wiring schemes (e.g. a traditional bus, daisy-chain, start, tree, etc.). The tenants 14 may be configured within the thin client on a bussed Ethernet network 4, a daisy chain, ring, tree or star type network (not shown). The network may be wireless, e.g., WIFI, Bluetooth or virtually any communications network. These networks, also, may be combinations of both hard-wired and wireless types.

Communications among the interface 10, the thin client, the Host Server and the tenants may include a two way link with known protocols. Briefly, for example, the Host and each thin client must establish a communication link, and the meanings (protocol) of the bits transferred between the two must be understood by both. The actual network types and protocols among the above listed items are what distinguishes the different networks listed above, but virtually any network may be employed by the present invention, and, as such, the network and the protocol are ancillary to the present disclosure and will not be discussed further unless germane to a particular issue being discussed.

FIG. 1 highlights the efficiency of a host/server communicating with a thin client and many tenants. These tenants, as described above, may be synchronized to position the work piece and the syringe tip, but the tenants that are driving syringe assemblies 8 may all be synchronized with respect to each other. When so synchronized these dispensing may include a complex sequence of dispensing different amounts at different time at different locations on a work piece. The result may be very time and cost efficient process, but also very complex assemblies may be handled more easily and with better quality.

Figure 2:
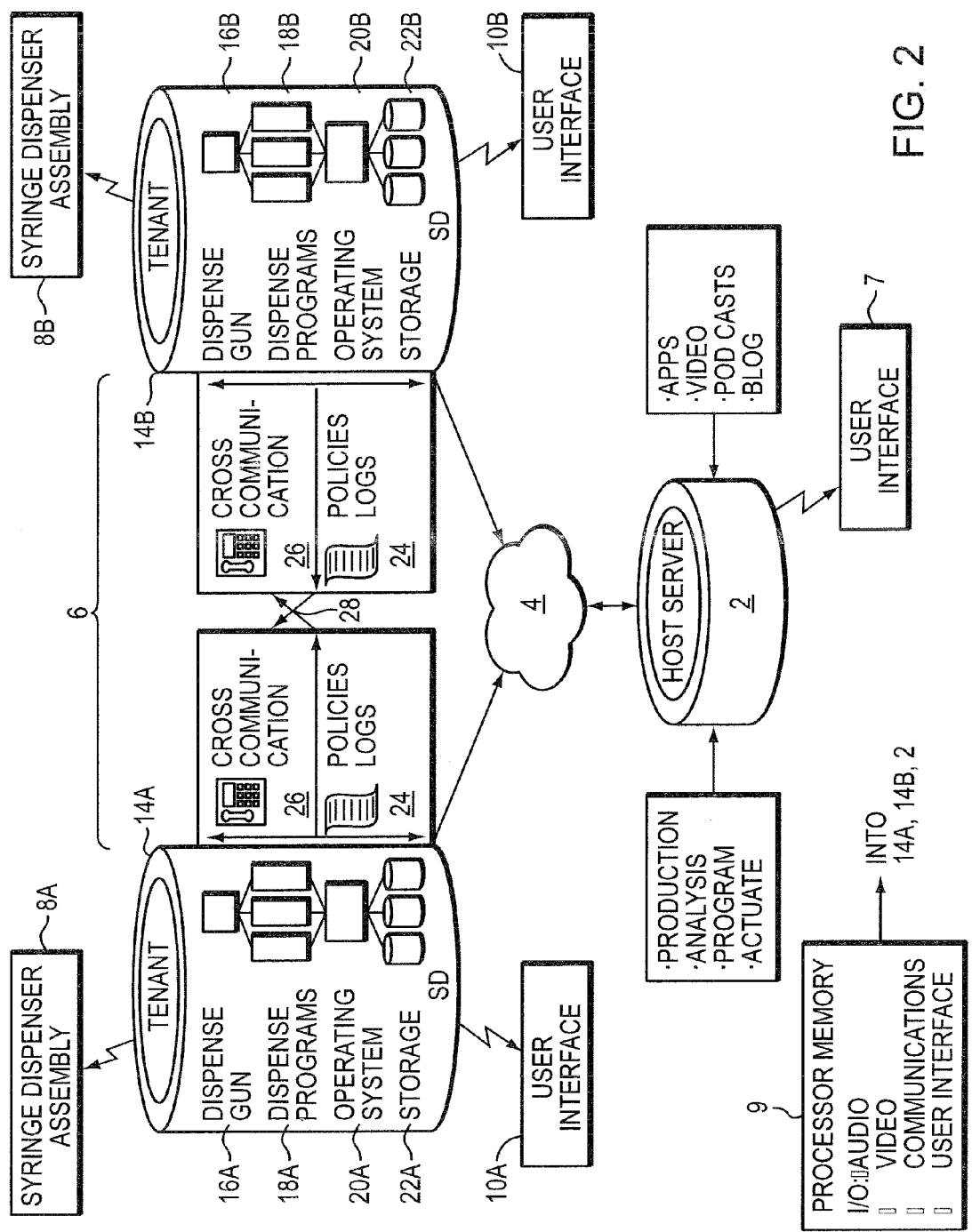
FIG. 2 is a block diagram with more detail between tenants.

FIG. 2 illustrates one host server 2 communicating with two tenants 14A and 14B within a thin client 6. Each tenant contains a program to activate the motor that drives the piston in dispensing syringes 16A, 16B. Each tenant contains a dispensing program 18A, 18B that controls the position of the syringe tip relative to the work piece and the timing of coordination of the dispensing with the relative locations. Each tenant communicates with a local user interface, e.g., a GUI, 10A, 10B.

Each tenant may contain an operating system 20A, 20B that controls the hardware/software assets within and available to each tenant for fluid dispensing and communicating with the host server 2 via the Internet 4, and with communicating with each other 28 via communication equipment 26. Such equipment may include parallel (bus) and/or serial (USB's) connections. The assets available to each tenant may include storage 22A, 22B and the interface program to access the storage hardware. The storage may include flash, RAM, CD's, and mass storage disks, etc. Those interface programs may in filers, filters, and other programs well known to those skilled in the art. The memory may include buffers, cache, and RAM (main memory) containing executable code. Mass or disk and flash memories may be found in some applications. Other I/O connections and drivers for those I/O devices include audio, video, motor drives for the syringes and X-Y positioning tables 13.

The Host/Server has hardware/software similar to that in each tenant but to a much larger and more complex degree. The assets available to the Host/Server 2 may include storage containing communication software and operating systems and executable code; processors and I/O interface hardware and program to access the storage hardware and communicate to the thin clients. The software may include standard packetizing and sending and receiving of information via known protocols (TCP/IP, etc.). Security is provided with encryption, passwords, ah hoc addressing, etc. A user interface (keyboard, displays) 7 for the Host/Server may be provided.

As with the tenants 14, Host/Server memory storage may include flash, RAM, CD's, and mass storage disks, etc. Those interface programs may in filers, filters, and other programs well known to those skilled in the art. The memory may include buffers, cache, and RAM (main memory) containing executable code. Mass or disk and flash memories may be found in some applications. Other I/O connections and drivers for those I/O devices include audio, video, and dispensing programs, including multi-syringe synchronization programs.

Each tenant may be configured or loaded with policies 24 that may be exchanged with each other. These policies may include data and operational logs, relative priorities from storage lists of priorities. Communications to and from each tenant may include passwords, are encrypting and other such techniques known to protect each tenant as well as each thin client.

FIG. 2 illustrates the cross communication 26 of two tenants, but each tenant may communicate with all the tenants within a thin client. That communication may comprise a serial or parallel mode with all the tenants connected, or a daisy-chain serial connection may be established. For example, each tenant may communicate with an adjacent tenant, and, in turn, that tenant may communicate with a different tenant and so on until all the tenants are in communications with each other. In such a case each tenant must be distinguished from each other. When the tenants 14 in a thin client 6 are all in communication with each other locally in the thin client, the Host/Server 2 may down load a synchronized dispensing application to each tenant. The tenants may then synchronize their operations and work in harmony to accomplish the application on a single work piece or on multiple work pieces.

In the above scenario, each syringe assembly may be programmed to operate independently from all others, or any combination may be programmed to operate synchronously. That is, different volumes of fluids, at different times, at different locations, and with different types of dispensing (dots or beads, etc.) may all be dispensed in harmony to accomplish a particular task.

Still referencing FIG. 2, the Host/Server 2, in addition to downloading dispensing programs (tasks), may also down load different applications, educational videos, Pod casts, and notices to different geographical locations regarding common concerns, like inventory, best price/delivery of material, and updating inventories, etc. Problems and quality issues may be broadcast to pre-warn users of potential problems, etc., that might have been uncovered at one location and that may affect other locations.

Another aspect of the present application is that the centralized control allows one dispensing programs and/or specification to be used world-wide. That unity will help ensure reproducible, uniform quality world-wide.

In practice the information transferred between the Host/Server, the thin client, the tenants and the syringe assemblies and possible X-Y tables is centrally managed and distributed. That information must be stored and distributed securely to the proper recipients. The detailed program that dispenses a fluid passes from storage in the Host/Server, to the Internet, to the thin client, to the tenant and then to the syringe assembly. The security of the information and its secure delivery across these boundaries where information in mixed (say on the Internet) must be maintained. And any discrepancy must be tagged and resolved.

The details of the hardware software to accomplish this secure transfer is important to the practical implementation of the present invention. The hardware and software to accomplish the secure transfer of the information are found already in products made by Cisco, Network Appliances, EMC, VMware, Juniper and other companies making Internet, storage, and ancillary products. Some of the policies inherent to the products from these companies may be found in the POLICY/LOGS 24 of FIG. 2.

Operating systems that may be used with the Host/Server and the virtual tenants may include virtual equivalents of the ANDROID™, LINUX™, IPHONE™, XP™, Win7™ and JAVA™ and other such languages may be used in conjunction with compliant operating systems to develop applications.

The operation of the physical dispensing precise and accurate fluids and control of the dispensing, back pressure, back off, etc. is illustrated in the incorporated U.S. patents and application.

As mentioned above, a dispensing application may be developed heuristically for particular applications at a tenant. Once developed, the application may be up loaded to the Host and then down loaded to dispensers anywhere in the world. The process may be tested at each location to ensure quality and reliability. Part of the testing at each location, may entail a video showing the dot and/or bead that is sent to the Host/Server. The Host/Server may verify proper operation at the various locations. Voice communications may be used redundantly ensure proper operation with local personnel.

Advantageously, the Host and more than one local dispenser may cooperate on developing a dispensing program. Real time communication among the local dispensers and the Host allows for multiple designers to uncovered problems or other issues and resolve them quickly. Differences in locale, materials and operating personnel may be more quickly uncovered and resolved.

Figure 3:
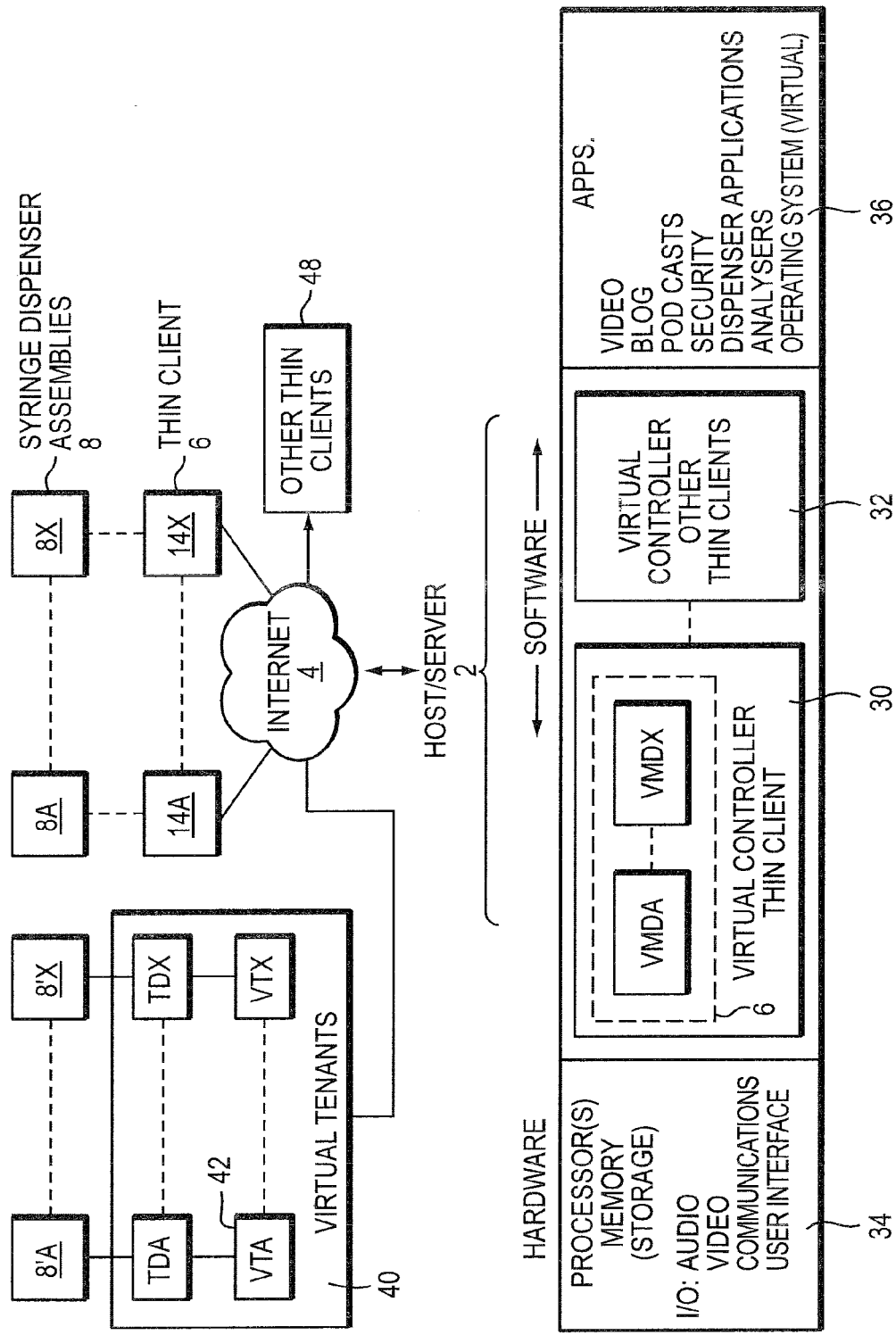
FIG. 3 is a block diagram illustrating the virtual nature of the Host/Server.

As suggested above, the entire system of Host/Server, Internet switches, thin clients, tenants, etc. may be designed from virtual components that emulate separate hardware and software structures. The virtual implementation performs as would the multiple hardware/software structures in a non-virtual system. FIG. 3 illustrates one virtual Host/Server controller and separate tenants, 14A-14X as well as virtual tenants VTA-VTX in a thin client 40. In the Host/Server 2, the hardware 34 may include processors, memory, and I/O interfaces for keyboards, indicators, audio, video, and communications. The software task may include the dispensing applications, video, audio, blogs, pod casts, security, analyzers of monitored dispenser applications, and a virtual operating system.

The virtual operating system provides of virtual controller, VMDA-VDMX, for each syringe dispenser assembly, 8A-8x, communicating with the Host/Server 2. The Host/Server may have additional virtual controllers 32 for other thin clients.

The virtual controllers 30-32 communicate with thin clients via the Internet 4. The thin client 6 houses the tenants 14A-14X, that match the virtual controller VMDA-VMDX in the Host/Server 2. Within the thin client 40, the tenants may be software configured as virtual tenants, VTA-VTX. Here each virtual tenant, e.g., VTA 42, drives a physical assembly, e.g., TDA that drives the syringe assembly 8'A. The Host/Server 2 may also drive other thin clients 48.

What is claimed is:

1. A fluid dispenser system of multiple syringe dispenser assemblies controlled via the Internet, the system comprising:
   a Host/Server in communication with at least one thin client via the Internet;
   each at least one thin client configured with, and in communication with, at least one tenant, wherein the at least one tenant communicates with a fluid dispensing syringe assembly; and
   wherein at least a first tenant of the at least one tenant associated with the at least one thin client is disposed in electrical communication with at least a second tenant of the at least one tenant associated with the same at least one thin client;
   the Host/Server comprising: a processor, memory, a user interface, video and audio hardware, communications hardware; an operating system, software application programs that details operational steps particular to a dispensing application;
   the at least one tenant comprises a processor, memory, a user interface, I/O and communications hardware and software, wherein the Host/Server downloads an application program to the at least one tenant via the Internet wherein when downloading the application program, the Host/Server is configured to download the application to multiple tenants to synchronize the multiple tenants and the corresponding fluid syringe assemblies to accomplish a dispensing application;
   wherein the at least one tenant is configured to feed back to the Host/Server information pertaining to the application performance program, and, wherein, the Host/Server comprises a virtual controller for the at least one tenant, and the at least one tenant comprises virtual tenants that drive the fluid dispensing syringe assemblies; and
   wherein when receiving feedback from the at least one tenant, the Host/Server is configured to:
   receive fluid dispensing status information associated with a fluid dispensing process at a first thin client of the one or more thin clients;
   compare the fluid dispensing status information with a template fluid dispensing status to generate a fluid dispensing result; and
   when the fluid dispensing status information falls outside of the template fluid dispensing status, forward the fluid dispensing result to at least a second thin client of the one or more thin clients via the Internet, the second thin client being distinct from the first thin client.

2. The fluid dispenser system of claim 1 wherein at least one resource needed to perform the application program is found on the Internet.

3. The fluid dispenser system of claim 1 further comprising:
   a training program developed at the Host/Server or at the one of more thin clients, wherein the training program may be accessed by the one or more tenants over the network and at other sites connected to the network.

4. The fluid dispenser system of claim 1 further comprising:
   tools for developing an application, wherein the tools are made available at the Host/Server and at the one or more syringe dispenser assemblies; and
   applications developed by the tools.

5. The fluid dispenser system of claim 4 wherein on application is directed towards ensuring that the fluid dispenser systems operates to meet a standard.

6. The fluid dispenser system of claim 5 wherein the standard may be validated for dispensers at different locations.

7. The fluid dispenser system of claim 4 wherein one application comprises a Webinar.

8. The fluid dispenser system of claim 1, wherein the at least one tenant comprises a set of syringe assembly driving tenants and a workpiece positioning tenant, each syringe assembly driving tenant of the set of syringe assembly driving tenants configured to control fluid dispensation of a corresponding syringe of the syringe assembly and the workpiece positioning tenant configured to position a workpiece relative to each syringe of the syringe assembly.

9. The fluid dispensing system of claim 8, wherein the at least a first tenant of the at least one tenant and the at least a second tenant of the at least one tenant are configured to exchange policy information associated with fluid dispensation of the syringe assembly to synchronize operation of the at least a first tenant of the at least one tenant and the at least a second tenant of the at least one tenant.

10. The fluid dispensing system of claim 1, wherein
   when comparing the fluid dispensing status information with the template fluid dispensing status to generate the fluid dispensing result, the Host/Server is configured to compare a weight of a fluid volume dispensed by the fluid dispensing syringe assembly with a template weight of the fluid volume to generate the fluid dispensing result; and
   when the weight of the fluid volume falls outside of the template weight of the fluid volume, the Host/Server is configured to forward the fluid dispensing result to the at least the second thin client of the one or more thin clients via the Internet, the second thin client being distinct from the first thin client.

11. The fluid dispensing system of claim 1, wherein
   when comparing the fluid dispensing status information with the template fluid dispensing status to generate the fluid dispensing result, the Host/Server is configured to compare a visual depiction of a fluid volume dispensed by the fluid dispensing syringe assembly with a template visual depiction of the fluid volume to generate the fluid dispensing result; and when the visual depiction of the fluid volume falls outside of the template visual depiction of the fluid volume, the Host/Server is configured to forward the fluid dispensing result to the at least the second thin client of the one or more thin clients via the Internet, the second thin client being distinct from the first thin client.

12. A process for controlling one or more fluid dispenser systems via the Internet, the process comprising the steps of:

downloading an application program from a virtual controller to at least one tenant configured in a thin client via the Internet to synchronize the at least one tenant and corresponding fluid syringe assemblies to accomplish a dispensing application;

running the application program within the at least one tenant, wherein the at least one tenant drives the syringe dispenser assembly, and wherein the at least one tenant comprises a first tenant in communication with a second tenant configured in the same thin client, the first tenant and the second tenant synchronized to accomplish the dispensing application;

developing fluid dispensing status information associated with a fluid dispensing process of the one or more fluid dispenser systems and communicating the status to a Host/Server; and when receiving fluid dispensing status information from the at least one tenant, the Host/Server is configured to:

receive fluid dispensing status information associated with a fluid dispensing process at a first thin client of the one or more thin clients;

compare the fluid dispensing status information with a template fluid dispensing status to generate a fluid dispensing result; and when the fluid dispensing status information falls outside of the template fluid dispensing status, forward the fluid dispensing result to at least a second thin client of the one or more thin clients via the Internet, the second thin client being distinct from the first thin client.

13. The process of claim 12 further comprising the step of accessing at least one resource needed to perform the application program via the Internet.

14. A Host/Server device, comprising:

a processor configured with an operating system and software application programs that details operational steps particular to a dispensing application; and a communications interface disposed in electrical communication with the processor;

the processor configured to:

synchronize multiple tenants and the corresponding fluid syringe assemblies to accomplish a dispensing application receive, via a network connection between the communications interface and a first thin client of a first tenant and of one or more thin clients, fluid dispensing status information associated with a fluid dispensing process at the first thin client of the one or more thin clients;

compare the fluid dispensing status information with a template fluid dispensing status to generate a fluid dispensing result; and when the fluid dispensing status information falls outside of the template fluid dispensing status, forward the fluid dispensing result to at least a second thin client of the one or more thin clients via the Internet, the second thin client being distinct from the first thin client.

* * * * *